United States Patent [19]
Omaru et al.

[11] Patent Number: 5,437,945
[45] Date of Patent: Aug. 1, 1995

[54] SECONDARY BATTERY HAVING NON-AQUEOUS ELECTROLYTE

[75] Inventors: Atsuo Omaru, Kanagawa; Shigeru Fujita, Tokyo, both of Japan

[73] Assignee: Sony Corporation, Tokyo, Japan

[21] Appl. No.: 131,957

[22] Filed: Oct. 8, 1993

[30] Foreign Application Priority Data

Mar. 19, 1993 [JP] Japan .................................. 5-060754

[51] Int. Cl.⁶ .......................................... H01M 10/40
[52] U.S. Cl. ..................... 429/197; 429/223; 429/224
[58] Field of Search ........................ 429/197, 223, 224

[56] References Cited

U.S. PATENT DOCUMENTS

| | | | |
|---|---|---|---|
| 3,544,385 | 12/1970 | Newman | 429/197 |
| 5,192,629 | 3/1993 | Guyomard et al. | 429/197 |
| 5,264,201 | 11/1993 | Dahn et al. | 429/223 X |
| 5,292,601 | 3/1994 | Sugeno et al. | 429/197 |

FOREIGN PATENT DOCUMENTS

| | | |
|---|---|---|
| 2-10666 | 1/1990 | Japan . |
| 5-234619 | 9/1993 | Japan . |

Primary Examiner—Stephen Kalafut
Attorney, Agent, or Firm—Hill, Steadman & Simpson

[57] ABSTRACT

A secondary battery which employs a non-aqueous solvent for the electrolyte and which includes a positive electrode formed of a compound oxide of lithium and a negative electrode of a carbonaceous material is disclosed. The non-aqueous electrolyte, comprised of an electrolyte dissolved in the non-aqueous solvent, is employed in such secondary battery. According to the present invention, a mixed solvent composed of propylene carbonate and methyl ethyl carbonate is employed. The volume ratio of propylene carbonate to methyl ethyl carbonate is 6:4 to 3:7 and preferably 4.5:5.5 to 3:7. As the electrolyte, $LiPF_6$ is dissolved at a concentration of 0.6 to 1.8 mol/lit. The battery is not increased in its internal pressure even when employed under a high temperature environment, while its electrolyte is not solidified when the battery is employed under a low temperature environment, such that a high energy density, a long service life and high operating reliability may be achieved over a broad range of the working temperature.

8 Claims, 7 Drawing Sheets

SECONDARY BATTERY HAVING NON-AQUEOUS ELECTROLYTE

BACKGROUND OF THE INVENTION

This invention relates to a secondary battery having a non-aqueous electrolyte. More particularly, it relates to a secondary battery containing a non-aqueous electrolyte therein, in which a lithium compound oxide and a carbonaceous material are used as a positive electrode and as a negative electrode, respectively.

Recently, new types of electronic equipment, such as a VTR with a built-in camera, portable phone or a lap-top computer, which are designed with an increasingly smaller size and weight, have made their debut. In keeping up therewith, a secondary battery has come into the limelight as being a portable electric power source, and searches and investigation are now proceeding briskly for realization of a higher energy density secondary battery.

Thus a lithium ion secondary battery has been proposed as a secondary battery having an energy density higher than that of a secondary battery containing an aqueous electrolyte, such as a lead battery or a nickel-cadmium battery, and is being put to practical application.

Meanwhile, since a low-viscosity solvent, employed for an organic electrolyte for a lithium secondary battery, gives only a low charging/discharging efficiency, if used alone, it is mandatory that such low viscosity solvent be mixed with a high dielectric constant solvent, such as propylene carbonate (PC). Besides, mixing PC into the low viscosity solvent leads to an advantage that the electrical conductivity higher than that obtained with the sole component system consisting only of the low viscosity solvent may be achieved. For this reason, a mixed solvent consisting of a mixture of PC and 1,2-dimethoxyethane (DHE) has so far been employed for the organic electrolyte for the lithium secondary battery.

However, the secondary battery having the non-aqueous electrolyte, in which the mixture of PC and DME is used as the solvent, has a disadvantage that, since DME has a low melting point, a current breaker sensitive to an internal pressure is erroneously activated to disable charging/discharging if the surrounding working temperature is raised to about 100° C. For this reason, such battery cannot be employed in a car in summertime. Besides, since DME is poor in stability with respect to the compound oxides of lithium, the battery capacity is deteriorated irrevocably if the battery is stored in the charged state.

As for low viscosity solvents other than DME, a low molecular weight carbonic acid ester having 1 to 3 number n of carbon atoms has been proposed in JP Patent KOKAI Application No. 2-148665, in which it is stated that the cycle life of the negative electrode of lithium metal may be improved by employing such carbonic acid ester alone as an organic solvent for the lithium secondary battery. However, in such case, the cycle life of the battery is on the order of 250 cycles which is considerably lesser than that of existing nickel-cadmium secondary battery which is about 500. Thus the lithium secondary battery cannot not be said to be unobjectionable as a battery for practical utilization.

On the other hand, if a mixture of PC with the above-mentioned low molecular weight carbonate ester is employed, the cycle life characteristics may be improved. Above all, with a secondary battery having the non-aqueous electrolyte, in which the carbonaceous material is employed as the negative electrode, a cycle life exceeding 1,000 cycles may be achieved. For example, with a mixed solvent composed of PC and a high boiling diethyl carbonate (DEC), among low molecular carbonic acid esters, an increase in the battery internal pressure is less likely to be incurred due to rise in the ambient temperature than in the case of employing a mixed solvent composed of DME and PC, resulting in improved stability with respect to the positive electrode. However, such battery suffers from a disadvantage that the capacity retention ratio, represented by the ratio of the capacity before the charging/discharging cycle to that after the charging/discharging cycle, is lower, with the result that the battery cycle life is shortened.

Researches have also been conducted on a mixed solvent composed of PC with dimethyl carbonate (DMC). It has been confirmed that the use of the mixed solvent leads to improved stability with respect to the positive electrode and the prolonged cycle life. However, the mixed solvent composed of DMC and PC has a drawback that it has a low boiling point and a high solidifying point thus leading to a narrow range of the battery working temperature.

In sum, the conventional secondary battery having the non-aqueous electrolyte has suffered from an inconvenience that, since the organic solvent is not fully suitable, limitations are placed on the working temperature, while a sufficiently long cycle life has not been achieved.

SUMMARY OF THE INVENTION

It is therefore an object of the present invention to provide a secondary battery having a non-aqueous electrolyte, in which a high energy density, a prolonged service life and high reliability may be achieved for a broad range of the working temperature.

Towards accomplishing the above object, the present inventors have conducted eager searches into suitable organic solvents which may be employed as the low viscosity solvent for the secondary battery having the non-aqueous electrolyte, and have found, as such suitable solvent, methyl ethyl carbonate (MEG) in which one of the methyl groups of DMC is replaced by an ethyl group. Since MEG has a boiling point and a solidifying point lying substantially intermediate between those of DMC and DEC, while exhibiting stability with respect to the positive terminal, a mixture thereof with PC gives a non-aqueous solvent which may be suitably employed as a non-aqueous solvent for the secondary battery containing a non-aqueous electrolyte.

The above information has led to fulfillment of the present invention, which is concerned with a secondary battery containing a non-aqueous electrolyte, which secondary battery comprises a negative electrode formed of a carbonaceous material to which lithium ions can be added by doping and from which the doped lithium ions may be detached by undoping, a positive electrode formed of $Li_xMO_2$, where M denotes at least one of cobalt, nickel and manganese, and the electrolyte having an electrolyte dissolved in a non-aqueous solvent, characterized in that the non-aqueous solvent is a mixed solvent of propylene carbonate and methyl ethyl carbonate.

The present invention is also characterized in that the non-aqueous solvent is a mixed solvent of propylene carbonate and methyl ethyl carbonate at a volumetric ratio of 6:4 to 3:7 and preferably 4.5:5.5 to 3:7.

The present invention is also characterized in that $LiPF_6$ is dissolved as an electrolyte in the non-aqueous solvent at a concentration of 0.6 to 1.8 mol/lit.

With the secondary battery having the non-aqueous electrolyte according to the present invention, PC and MEC are employed as a high dielectric constant solvent and as a low viscosity solvent for the electrolylse, respectively.

It is noted that HEC employed as the low viscosity solvent has the boiling point, and the solidifying point intermediate between those of DMC and DEC so that it is most suitable as the low viscosity solvent for the electrolyte. Besides, MEC is superior to DEC in its stability with respect to the positive and negative electrodes. Consequently, the secondary cell having the non-aqueous electrolyte is scarcely increased in its internal pressure when employed under high temperature environments, while the electrolyte is not frozen even when the battery is used under a low temperature environment, so that a high energy density and long service life may be attained over a broader range of the working temperature.

It is noted that a secondary battery having the non-aqueous electrolyte may be further improved in the charging/discharging characteristics if, when using the mixed solvent of HEC and PC as the non-aqueous solvent, the concentration of the electrolyte as well as the HEC- PC mixing ratio is optimized for increasing electrical conductance of the electrolyte.

DETAILED DESCRIPTION OF THE INVENTION

Figure 1:
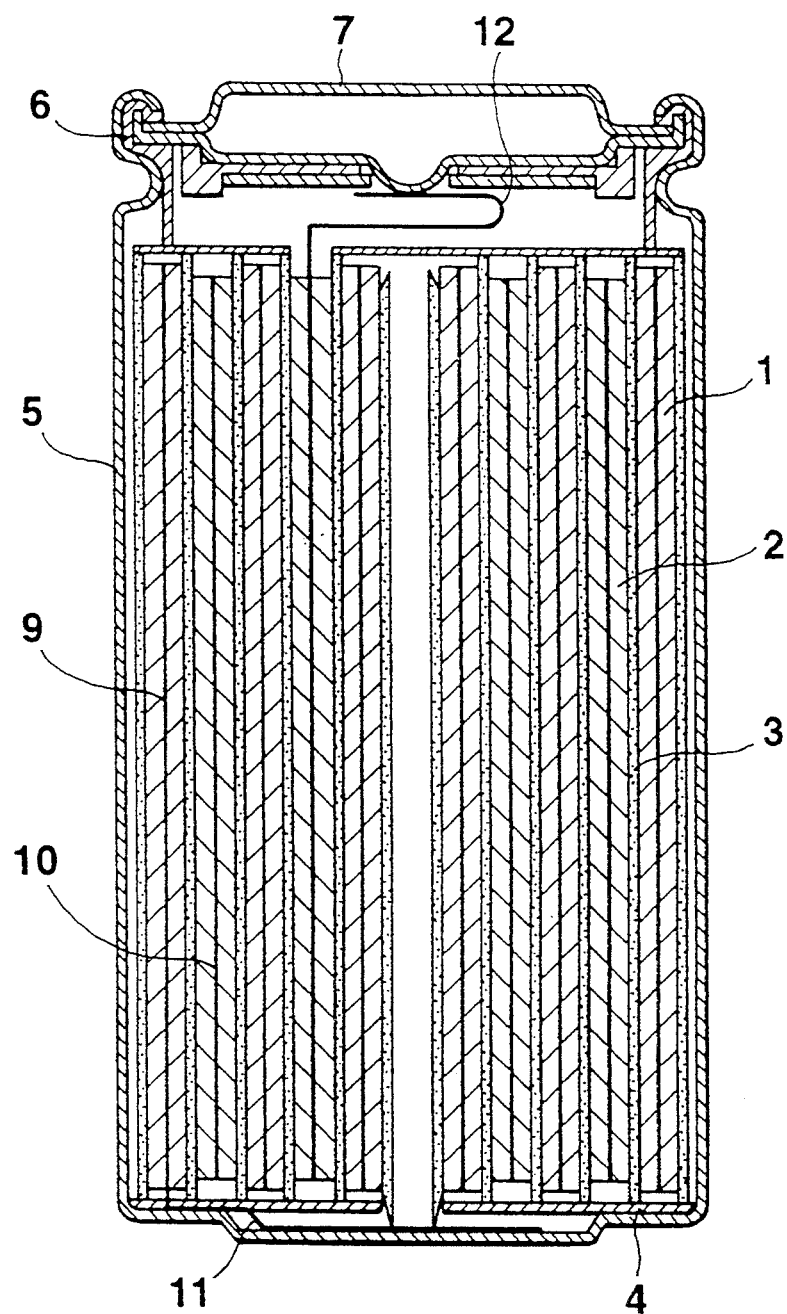
FIG. 1 is a schematic longitudinal cross-sectional view showing an example of a secondary battery containing a non-aqueous electrolyte according to the present invention.

A positive electrode material employed in the secondary battery containing a non-aqueous electrolyte according to the present invention is an inter-layer compound containing lithium Li and a compound metal-lithium compound represented by the general formula $Li_xMO_2$, where M denotes at least one of Co, Ni and Mn. The material exhibits a high energy density when $LiCoO_2$, above all is employed.

Although any of the carbonaceous materials employed for this type of the secondary battery may be employed for the negative electrode, the following materials are most preferred.

The carbonaceous material which is to be recited first of all is the carbonaceous material obtained on carbonizing an organic material by a technique such as calcination.

Among the organic materials employed as the starting material, there are a phenol resin, an acrylic resin, a halogenated vinyl resin, a polyimide resin, a polyamideimide resin, a polyamide resin, a conjugate resin, such as polyacetylene or poly (p-phenylene), cellulose and its derivatives, and optional organic high molecular compounds.

Other examples of the starting organic materials include condensed polycyclic hydrocarbon compounds, such as naphthalene, phenanthrene, anthracene, triphenylene, pyrene, perylene, pentaphene or pentacene, derivatives thereof, such as carboxylic acids, carboxylic anhydrides or carboxylic amide imides thereof, various pitches or condensed heterocyclic compounds mainly containing mixtures of the above compounds, such as acenaphtylene, indole, isoindole, quinoline, isoquinoline, quinoxaline, phthalazine, carbazole, acridine, phenazine or phenanthridine, and derivatives thereof.

Besides, furan resins consisting in homopolymers or copolymers of furfuryl alcohol or furrural are also desirable. The carbonaceous material, obtained on carbonizing the furan resins, exhibits extremely desirable properties as a material for a negative electrode material for a battery because it has a plane-to-plane distance between (002) planes of not less than 3.70 Å and true density of not higher than 1.70 g/cc, without having a peak of oxidative heating at a temperature not lower than $700°$ C., as evidenced by differential thermal analysis (DTA).

The temperature for calcining these organic materials differs from one starting material to another, and is usually in a range of from $500°$ to $3000°$ C.

Alternatively, a petroleum pitch having a particular H/C atomic ratio and having an oxygen-containing functional group introduced thereinto by way of oxygen cross-linking, may also be employed as the above mentioned organic material, because it displays superior properties when carbonized, similarly to the above-mentioned furan resin.

Such petroleum pitch may be produced from asphalt or tar produced on high temperature thermal cracking of coal tar, ethylene bottoms or crude oil, by distillation, such as vacuum distillation, atmospheric distillation or steam distillation, thermal polycondensation, extraction or chemical polycondensation.

At this time, the H/C atomic ratio is critical. In order to produce carbon which is difficult to graphitize, the H/C ratio should be in a range of from 0.6 to 0.8.

Although there is no particular limitation to concrete means for introducing the oxygen-containing functional groups into such petroleum pitch, they may be enumerated by a wet method by aqueous solutions of nitric acid, mixed acids, sulfuric acid or hypochlorous acid, a dry method by oxidizing gases, such as air or oxygen, and a reaction by solid reagents, such as sulfur, ammonium sulfate, ammonium persulfate or ferric chloride.

If oxygen is introduced into the petroleum pitch by the above technique, the ultimate carbonaceous material may be obtained in the solid-phase state without undergoing the melting in the carbonizing process at a temperature of 400° C. or higher. The process is similar to the process of generating the carbon which is difficult to graphitize.

When the petroleum pitch into which the oxygen-containing functional group is introduced by the above-mentioned technique is carbonized to produce the negative electrode material, there is no particular condition to be met for carbonization. That is, the negative electrode material doped with a larger amount of lithium per unit weight may be produced if only the condition for carbonization is so set that a carbonaceous material having the plane-to-plane distance between the (002) planes of not less than 3.70 Å and the true density of not higher than 1.70 g/cc may be produced, such material not having a peak of oxidative heating at a temperature of not lower than 700° C. as evidenced by DTA. The plane-to-plane distance between the (002) planes of not less than 3.70 Å may be realized by setting the oxygen content of the oxygen cross-linked petroleum pitch as a precursor so as to be not less than 10 wt %. Consequently, the oxygen content of the precursor is preferably set so as to be not less than 10 wt % and, for practical application, in a range of from 10 to 20 wt %.

For producing the carbonaceous material using the above-described organic starting material, it suffices to carbonize the starting material in a nitrogen stream at 300° to 700° C. and subsequently calcine the carbonized material in a nitrogen atmosphere at a temperature rise rate of 1° to 20° C. per minute, a reached temperature of 900° to 1300° C. and a retention time interval at the reached temperature of 0 to 5 hours. The carbonizing process may naturally be omitted, if so desired.

Besides, special negative electrode materials doped with a large amount of lithium may also be employed by adding phosphorous or boron compounds during carbonization of the furan resin or the petroleum pitch.

As for the phosphorous compounds, oxides of phosphorous, such as phosphorous pentoxide, oxo acids, such as o-phosphoric acid, and salts thereof, may be employed. Oxides of phosphorous and phosphoric acid are most preferred for ease in handling.

The amount of addition of the phosphorus compounds is 0.2 to 30 wt % and preferably 0.5 to 15 wt %, as phosphorous, while the amount of residual phosphorous in the negative electrode material is 0.2 to 9.0 wt % and preferably 0.3 to 5 wt %, based on the amount of the organic or carbonaceous material.

As for the boron compounds, oxides of boron or boric acid may be added as an aqueous solution. The amount of addition of the boron compound is 0.2 to 30 wt % and preferably 0.5 to 15 wt %, as boron, while the amount of residual boron in the negative electrode material is 0.2 to 9.0 wt % and preferably 0.3 to 5 wt %, based on the amount of the organic material or the carbonaceous material. Although a graphite material may also be employed, ethylene carbonate should be employed in place of propylene carbide because the latter then undergoes decomposition.

The secondary battery containing a non-aqueous electrolyte according to the present invention is comprised of a negative electrode formed of the above-mentioned negative electrode material and a positive electrode formed of the above-mentioned positive electrode material , both enclosed within a battery casing along with an electrolyte composed of an electrolyte dissolved in a non-aqueous solvent.

According to the present invention, a mixed solvent composed of above-mentioned MEG, as the low-viscosity solvent, and PC, as the high dielectric constant solvent, is employed as the non-aqueous solvent in which the electrolyte is to be dissolved. The mixed solvent, composed of MEC and PC, has optimum boiling and solidifying points, while exhibiting high stability with respect to the positive electrode. Consequently, by employing such mixed solvent, a high energy density and a long cycle life may be achieved over a broad range of the working temperature.

Meanwhile, in the mixed solvent composed of MEG and PC, it is desirable that MEC and PC be mixed together at a volumetric ratio of PC:MEG in a range of from 6:4 to 3:7. If the mixing ration of PC and MEG is outside the above range, the risk is high that the electrical conductance of the electrolyte be lowered to render the battery characteristics hardly satisfactory.

The electrolyte to be dissolved in the above-mentioned non-aqueous solvent may be enumerated by $LiPF_6$, $LiClO_4$, $LiAsF_6$, $LiBF_4$, $LiB(C_6H_5)_4$, $CH_3SO_3Li$, $CF_3SO_3Li$, $LiCl$ and $LiBr$.

There is a certain optimum range of the concentration with which these electrolyte are to be dissolved in the above-mentioned non-aqueous solvent. For example, $LiPF_6$ is preferably dissolved in the electrolyte at a concentration of 0.6 to 1.8 mol/lit. If the concentration of $LiPF_6$ is outside the above range, the risk is similarly high that the electrical conductance of the electrolyte be unsatisfactory to render the charging/discharging efficiency insufficient.

The present invention will be explained further with reference to Examples and in accordance with the results of experiments.

EXAMPLE 1

The present Example is directed to a secondary battery containing a non-aqueous electrolyte, in which $LiPF_6$ dissolved in a mixed solvent composed of PC and MEC mixed together at a volumetric ration of 1:1, a carbon material difficult to graphitize, and $LiCoO_2$, are employed as the non-aqueous electrolyte, the negative electrode material and as the positive electrode material, respectively. The construction of the secondary battery containing a non-aqueous electrolyte, produced with the present Example, is shown in FIG. 1.

First, a negative electrode was produced in the following manner.

A petroleum pitch having its H/C atomic ratio selected suitably from the range of from 0.6 to 0.8, was crushed and oxidized under an air stream to produce a carbon precursor. The non-soluble quinoline component, as measured in accordance with the centrifugal method provided in JIS K2425-1983, was 80%, while the oxygen content thereof, as measured by a method for analysis of organic elements, was 15.4 wt %.

The carbon precursor was heated to 1000° C. in a nitrogen stream for heat-treatment to produce a difficultly graphitizable carbon material, which was then pulverized to powders of a carbon material having a mean particle size of 10 μm. The results of X-ray diffraction analyses of the difficultly graphitizable carbon material thus produced have revealed that the plane-to-plane distance of the (002) planes was 3.76 Å, with the true specific gravity being 1.58.

90 parts by weight of the powders of the carbon material were mixed with 10 parts by weight of polyvinylidene fluoride as a binder to produce a negative electrode material, which material was then dispersed in a solvent N-methyl-2-pyrrolidone to a slurry to produce a negative electrode slurry.

The negative electrode slurry thus produced was coated uniformly on both surfaces of a band-shaped copper foil, 10 μm in thickness, which was to be a negative electrode current collector. The resulting assembly was dried and compression-molded by a roll press to produce a band-shaped negative electrode 1.

A positive electrode 2 was then produced in the following manner.

Lithium carbonate and cobalt carbonate were mixed together at a molar ratio of 0.5 to 1 and calcined in air at 900° C. for five hours to produce $LiCoO_2$.

91 parts by weight, of $LiCoO_2$ thus produced were mixed with 6 parts by weight of graphite as an electrically conductive material and 3 parts by weight of polyvinylidene fluoride as a binder to produce a positive electrode mixture, which mixture was then dispersed in a solvent N-methyl-2-pyrrolidone to a slurry to produce a positive electrode slurry.

The positive electrode slurry thus produced was coated uniformly on both surfaces of a band-shaped aluminum foil, 20 μm in thickness, which was to be a positive electrode current collector. The resulting assembly was dried and compression-molded by a roll press to produce a band-shaped positive electrode 2.

The band-shaped negative electrode 1 and the band-shaped negative electrode 2 were then coiled, with a fine porous polypropylene film separator 3 in-between, to form a spiral-shaped electrode, as shown in FIG. 1. The negative electrode, the positive electrode and the separator were adjusted in advance as to the length and the width so that the electrodes and the separator may be snugly contained in a battery casing 5 having a diameter of 20 mm and a height of 50 mm when the electrodes and the separator should be employed as spirally-shaped electrode elements.

The spiral-shaped electrodes thus produced were contained in an nickel-plated iron battery casing 5 and insulator plates 4 were placed on the upper and lower surfaces of the spiral-shaped electrodes contained in the battery casing 5. An aluminum positive lead 12 and a nickel negative lead 11 were led out from the positive electrode collector 10 and the negative electrode collector 9, respectively, so as to be welded to the battery can 5.

In a mixed solvent composed of 50 vol % of PC and 50 vol % of MEC was dissolved $LiPF_6$ at a ratio of 1 mol of $LiPF_6$ to 1 lit. of the mixed solvent to produce an electrolyte, which was then injected into the battery casing 5. The battery casing was then caulked with the interposition of an insulated gasket 6 coated with asphalt to secure a battery lid 7 to produce a cylindrical-shaped secondary battery having a diameter of 20 mm and a height of 50 mm, containing the non-aqueous electrolyte (battery of the embodiment 1).

Comparative Example 1

A cylindrical-shaped secondary battery containing the non-aqueous electrolyte (battery of the comparative embodiment 1) was prepared in the same way as in Example 1 except employing an electrolyte consisting in $LiPF_6$ dissolved in a mixed solvent composed of 50 vol % of PC and 50 vol % of DEC at a ratio of 1 mol of $LiPF_6$ to 1 lit. of the mixed solvent.

Comparative Example 2

A cylindrical-shaped secondary battery containing the non-aqueous electrolyte (battery of the comparative embodiment 2) was prepared in the same way as in Example 1 except employing an electrolyte consisting in $LiPF_6$ dissolved in a mixed solvent composed of 50 vol % of PC and 50 vol % of DMC at a ratio of 1 mol of $LiPF_6$ to 1 lit. of the mixed solvent. The battery of the embodiment 1, the battery of the comparative example 1 and the battery of the comparative example 2 thus prepared were charged by float charging at 4.1 V at a temperature of 60° C. and the relation between the float time and the internal pressure in the battery was checked. The results are shown in FIG. 2.

Figure 2:
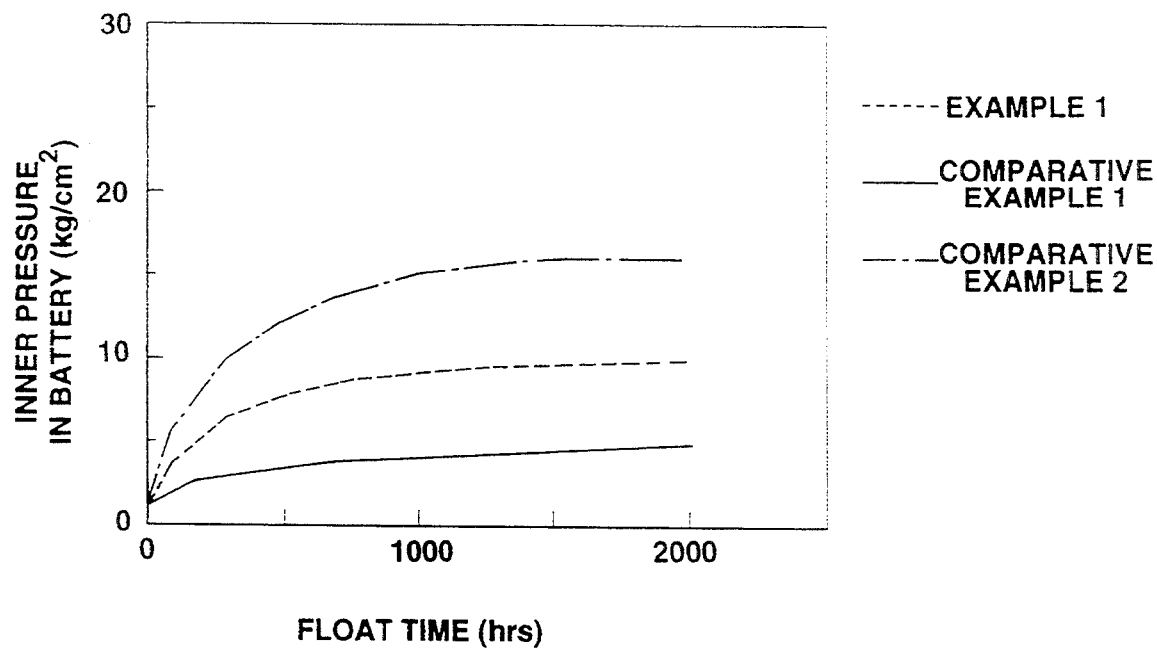
FIG. 2 is a graph showing the relation between the floating time and the internal pressure of the secondary battery containing a non-aqueous electrolyte.

It is seen from FIG. 2 that the rise in the internal pressure in the battery is more significant with the battery of the comparative example 2 than with the battery of the embodiment 1 or the battery of the comparative example 1.

It is seen from this that the mixed solvent composed of PC and DMC as the non-aqueous solvent is not suitable to be used under an environment of an elevated temperature.

The charging/discharging cycles, consisting in charging up to the maximum voltage of 4.1 V with the charging current of 1 A for 2.5 hours followed by discharging up to the ultimate voltage of 2.75 V with a constant resistor of 6.2 ohm, were performed on the respective batteries to check into changes in the energy density accompanying the charging/discharging cycles. The results are shown in FIG. 3.

Figure 3:
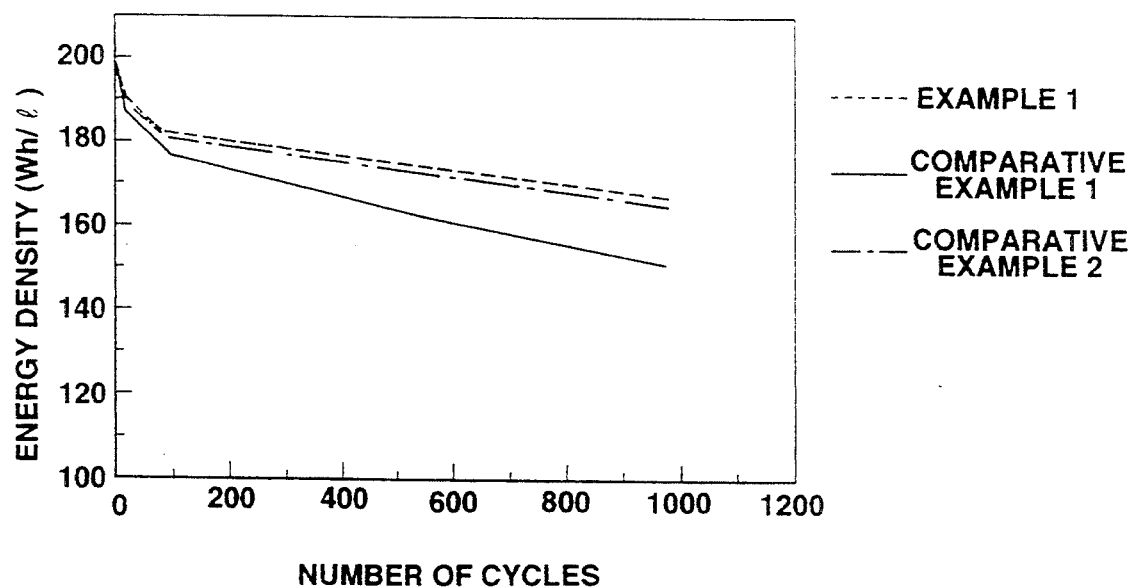
FIG. 3 is a graph showing the relation between the energy density and the number of charging/discharging cycles of the secondary battery containing a non-aqueous electrolyte.

It is seen from FIG. 3 that the battery of the embodiment 1 and the battery of the comparative example 2 are subjected to a lesser decrease in the energy density with increase in the number of the charging/discharging cycles and exhibit satisfactory cycle characteristics, while the battery of the comparative example 1 is subjected to significant decrease in energy density with increase in the number of cycles.

That is, with the secondary battery employing a non-aqueous electrolyte, cyclic characteristics become unsatisfactory if the PC-DEC mixed solvent, is employed.

Then, electrical discharge was carried out, for each of the batteries at −20° C. with a constant, resist or of 6.2 ohm to check into the relation between the discharge time and the voltage. The results are shown in FIG. 4.

Figure 4:
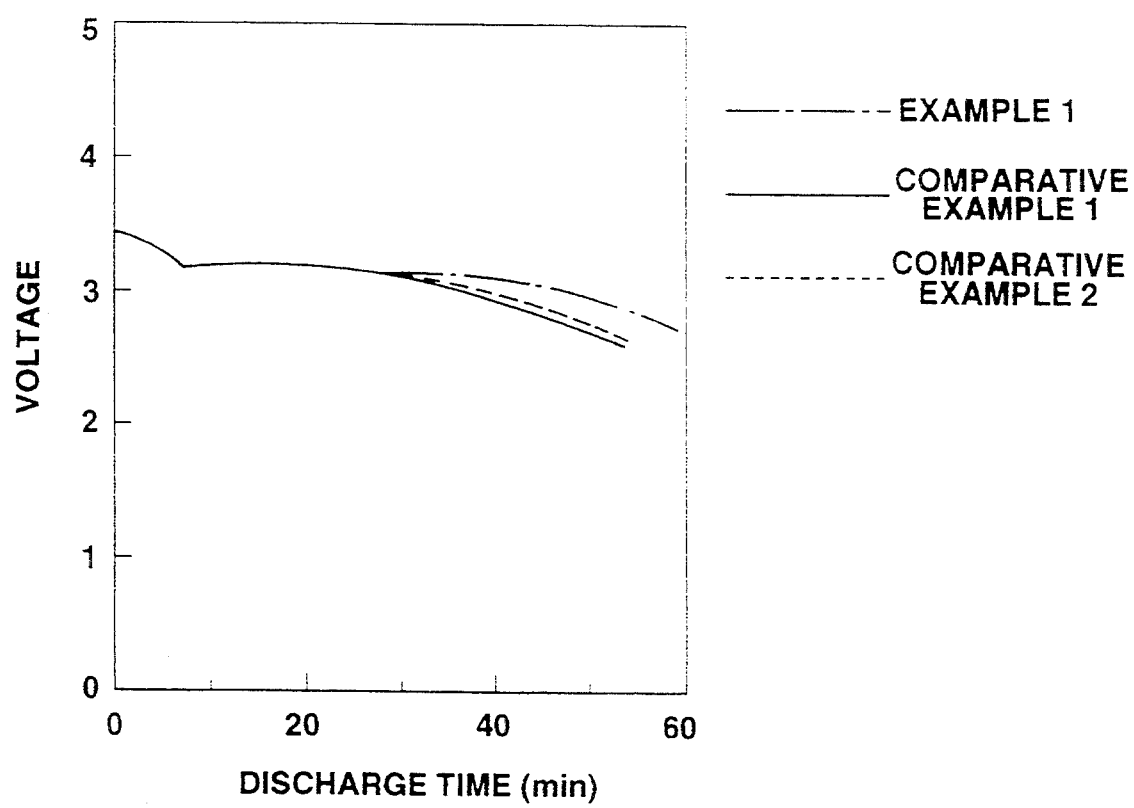
FIG. 4 is a graph showing the relation between the voltage and the discharging time of the secondary battery containing a non-aqueous electrolyte under an environment of the temperature of $-20°$ C.

It is seen from FIG. 4 that, the battery of the Example 1 undergoes less voltage drop than in the other batteries and exhibits superior characteristics even under low temperature environments.

The above results demonstrate that the PC-MEC mixed solvent is suitable as the non-aqueous solvent for the secondary battery containing the non-aqueous electrolyte, and that, by employing the PC-MEC mixed solvent a high energy density and a long service life may be realized over a broader temperature range.

For reference sake, Table 1 illustrates the values of electrical conductance of the electrolytes employed for the respective batteries for various temperatures, while Table 2 illustrates whether or not these electrolytes are in the frozen states.

TABLE 1

| | non-aqueous solvent | electrical conductance (mS/cm) | | | |
|---|---|---|---|---|---|
| | | 22° C. | 0° C. | −10° C. | −20° C. |
| Ex. 1 | PC + MEC | 9.1 | 5.4 | 4.0 | 2.9 |
| Comp. Ex. 1 | PC + DEC | 7.5 | 4.3 | 3.1 | 2.4 |
| Comp. Ex. 2 | PC + DMC | 11.2 | 6.6 | 5.0 | 3.7 |

TABLE 2

| | non-aqueous solvent | frozen states | | |
|---|---|---|---|---|
| | | −30° C. | −40° C. | −50° C. |
| Ex. 1 | PC + MEC | non-frozen | non-frozen | non-frozen |
| Comp. Ex. 1 | PC + DEC | non-frozen | non-frozen | non-frozen |
| Comp. Ex. 2 | PC + DMC | frozen | frozen | frozen |

It may be seen from Table that the electrolyte composed of PC and MEC and the electrolyte composed of PC and DEC remain unfrozen and remain in liquid states even at −50° C., while the electrolyte containing PC and DMC is frozen at −30° C. On the other hand, Table 1 shows that the conductance of the electrolyte containing PC and DEC is lower than that of the other electrolytes.

That is, it may be seen that the electrolyte composed of PC and MEC is superior in both low temperature characteristics and in electrical conductance.

EXAMPLE 2

A spiral-shaped battery was produced, which had a structure similar to that of Example 1 except being dimensioned to be snugly contained within a battery can having a diameter of 18 mm and a height of 65 mm.

The spiral-shaped electrodes thus produced were contained in an nickel-plated iron battery casing and insulator plates 4 were placed on the upper and lower surfaces of the spiral -shaped electrodes contained in the battery casing 5. An aluminum positive lead and a nickel negative lead were led out from the positive electrode collector and the negative electrode collector, respectively, so as to be welded to the battery can.

In a mixed solvent composed of 30 vol % of PC and 70 vol % of MEC was dissolved LiPF$_6$ at various concentrations to produce a plurality of electrolytes, which were then injected into the battery casing. The battery casing was then caulked with the interposition of an insulated gasket coated with asphalt to secure a battery lid t produce a cylindrical-shaped secondary battery containing the non-aqueous electrolyte, with the diameter and the height of the battery being 18 mm and 50 mm, respectively.

Meanwhile, LiPF$_6$ was dissolved in the mixed solvent at the concentrations of 0.5, 0.6, 0.8, 1.0, 1.2, 1.4, 1.6, 1.8 and 2.0 tool per liter of the mixed solvent.

EXAMPLE 3

A plurality of cylindrical-shaped secondary batteries containing non-aqueous electrolytes (batteries of example 3) were produced in the same way as in Example 2, except using the electrolytes obtained by dissolving LiPF$_6$ at the various concentrations in a mixed solvent composed of 40 vol % of PC and 60 vol % of MEC.

EXAMPLE 4

A plurality of cylindrical-shaped secondary batteries containing non-aqueous electrolytes (batteries of example 4) were produced in the same way as in Example 2, except using the electrolytes produced by dissolving LiPF$_6$ at the various concentrations in a mixed solvent composed of 50 vol % of PC and 50 vol % of MEC.

EXAMPLE 5

A plurality of cylindrical-shaped secondary batteries containing non-aqueous electrolytes (batteries of example 5) were produced in the same way as in Example 2, except using the electrolytes obtained by dissolving LiPF$_6$ at the various concentrations in a mixed solvent composed of 60 vol % of PC and 40 vol % of MEC.

EXAMPLE 6

A plurality of cylindrical-shaped secondary batteries containing non-aqueous electrolytes (batteries of example 6) were produced in the same way as in Example 2, except using the electrolytes produced by dissolving LiPF$_6$ at the various concentrations in a mixed solvent composed of 70 vol % of PC and 30 vol % of MEC.

Comparative Example 3

A cylindrical-shaped secondary battery containing a non-aqueous electrolyte (battery of comparative example 3) was produced in the same way as in Example 2, except using the electrolyte obtained by dissolving LiPF$_6$ in a mixed solvent composed of 50 vol % of PC and 50 vol % of DEC at a ratio of 1 mol of LiPF$_6$ per liter of the mixed solvent.

Measurement was then made of cyclic, high-temperature and low-temperature characteristics of the batteries produced as above, by way of measuring the effects which the electrolytes have on the battery characteristics.

As for the cyclic characteristics, a charging/discharging cycle, consisting in charging the batteries to a constant voltage under conditions of a charging current of 1 A and a voltage of 4.2 V, followed by discharging at a discharging load of 6.2 ohm and a cut-off voltage of 2.75 V, was repeatedly carried out, and measurement was then made of the capacity upkeep ratio represented by the ratio of the capacity at the 100th cycle to that at the second cycle (capacity at the 100th cycle / capacity at the second cycle).

As for the high-temperature characteristics, after a battery was initially charged, and three charging/discharging cycles followed by the fourth charging, under the aforementioned charging and discharging conditions, were carried out, the battery was allowed to stand under the thus charged state at 90° C. for 40 hours, and measurement was then made of the internal pressure within the battery.

As for the low-temperature characteristics, under an assumption that the battery is employed for audio/video equipment designed for discharging at a constant output, two charging/discharging cycles, each consisting in charging for 2.5 hours under a constant voltage with a charging current of 1 A and a charging voltage of 4.2 V at 23° C., followed by discharging under a constant discharge load of 2.5 W and a cut-off voltage of 2.75 V at 23° C., were carried out, and constant voltage charging at the charging current of 1 A and a voltage of 3.9 V at 23° C. was carried out for 2.5 hours, by way of a third cycle. A constant output discharge was then carried out with the charging current of 1 A and a voltage of 3.9 V at 23° C. for 2.5 hours, and finally a constant output discharging at 3 W was carried out at −5° C. up to a cut-off voltage of 3.0 V.

Figure 5:
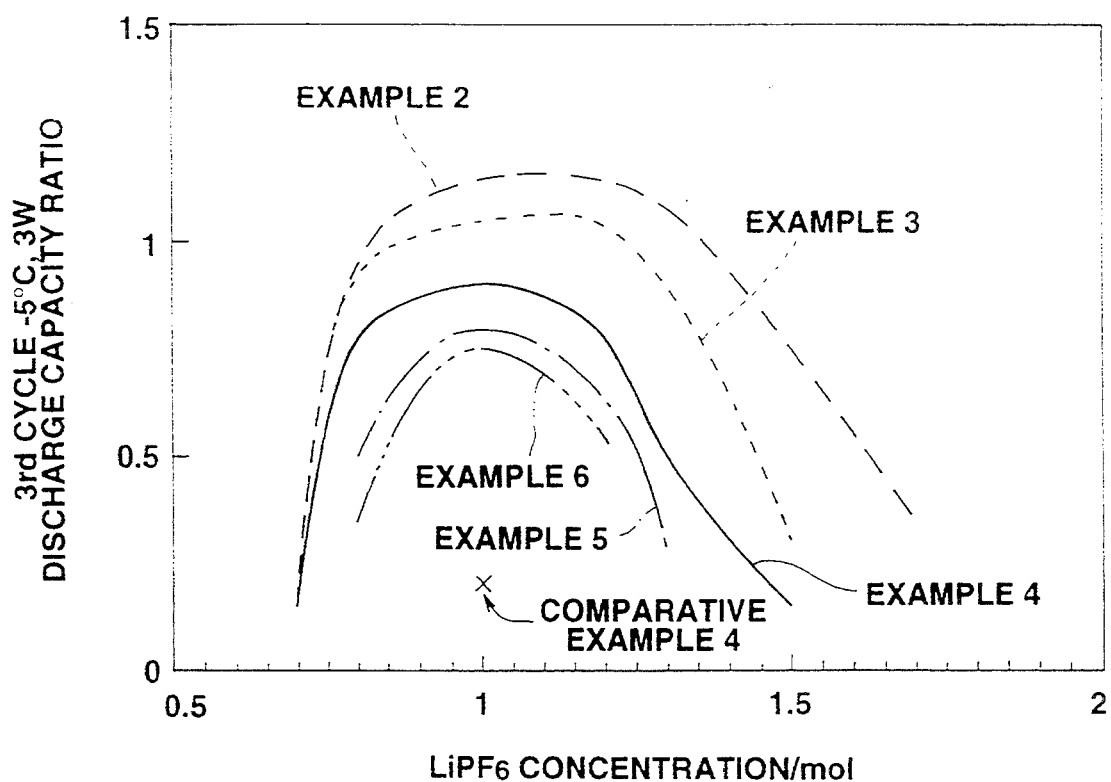
FIG. 5 is a graph showing the relation between the electrolyte concentration and the discharging capacity ratio for the third charging/discharging cycle under an environment of the temperature of $-5°$ C.
Figure 6:
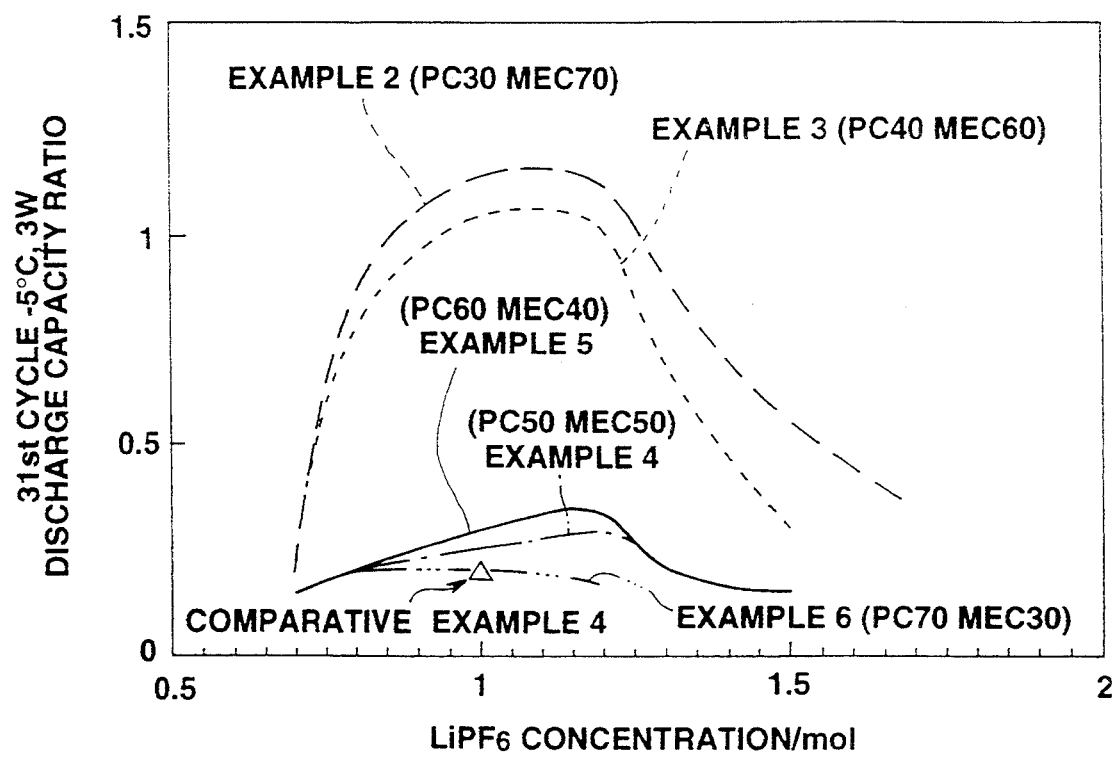
FIG. 6 is a graph showing the relation between the electrolyte concentration and the discharging capacity ratio for the 31st charging/discharging cycle under an environment of the temperature of $-5°$ C.
Figure 7:
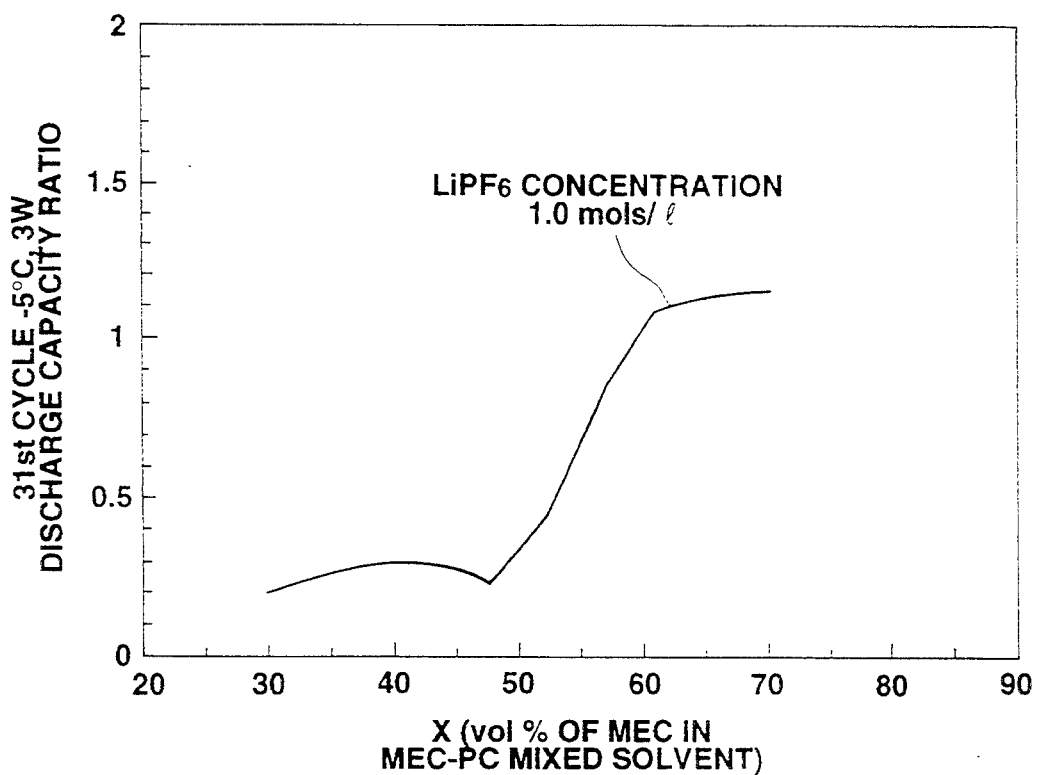
FIG. 7 is a graph showing the relation between the discharging capacity ratio and the volumetric increase in percentage of MEC in the mixed solvent for the 31st charging/discharging cycle under an environment of the temperature of $-50°$ C., with the concentration of $LiPF_6$ being 1.0 mol/lit.
Figure 8:
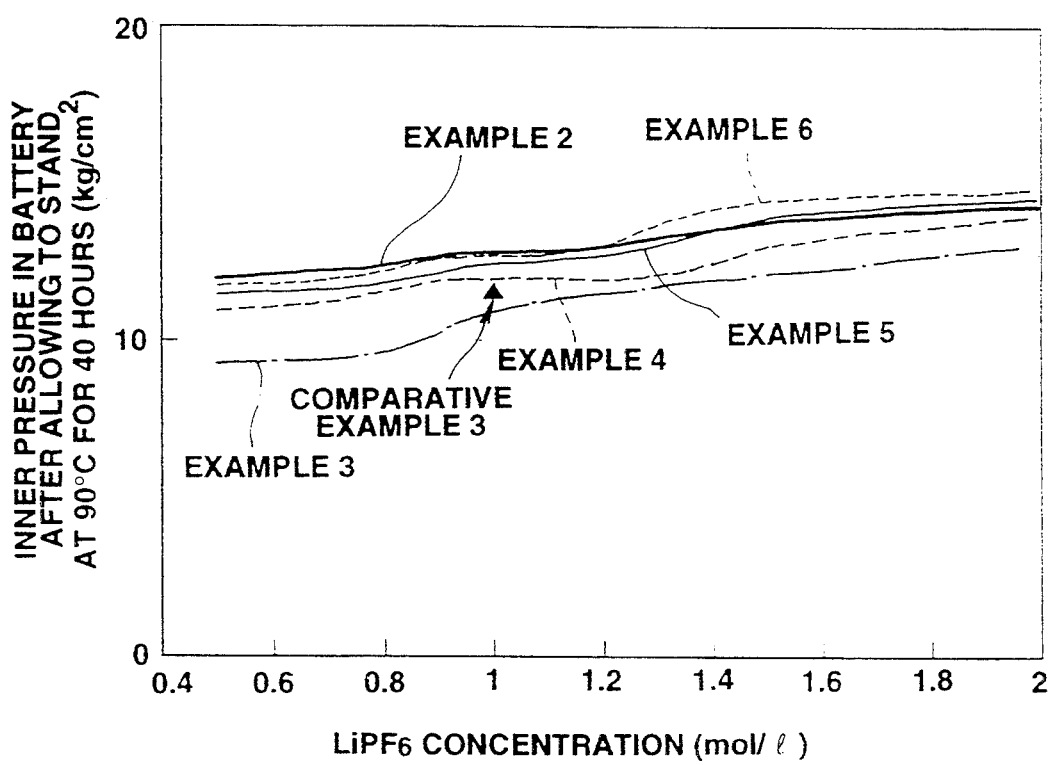
FIG. 8 is a graph showing the relation between the concentration of $LiPF_6$ in the electrolyte and the internal pressure in the battery after allowing the battery to stand in the charged state under an environment of the temperature of $90°$ C.
Figure 9:
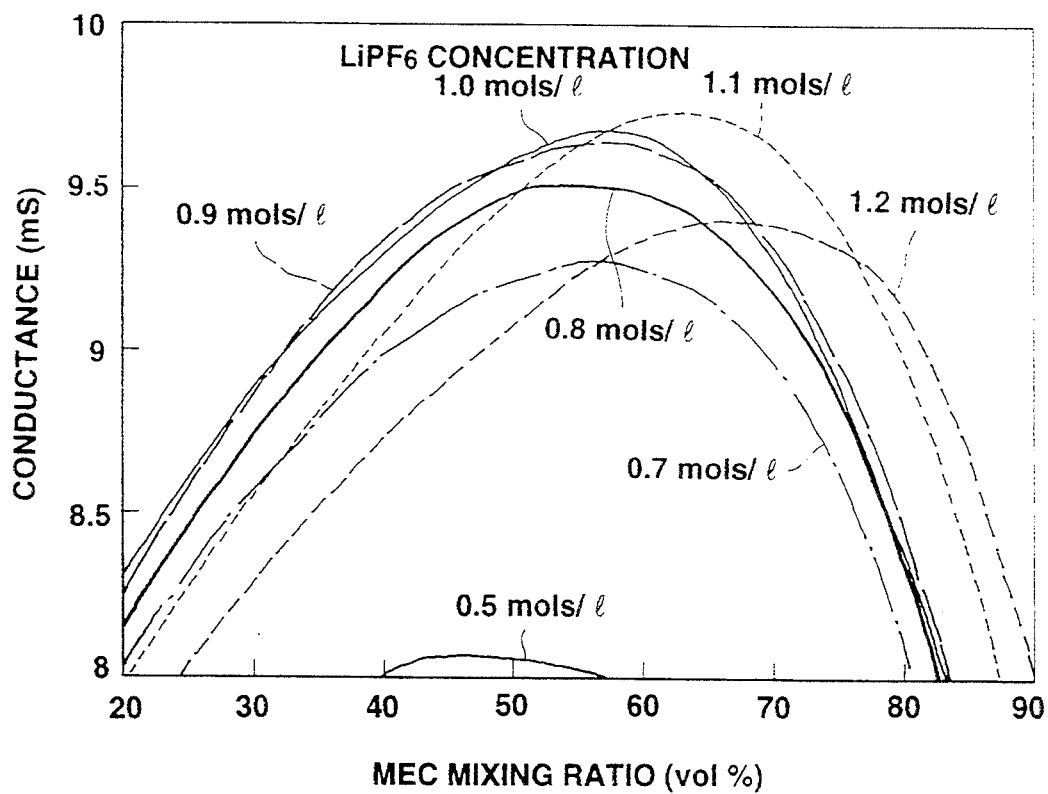
FIG. 9 is a graph showing the relation between the MEC mixing ratio in the electrolyte and electrical conductance.
Figure 10:
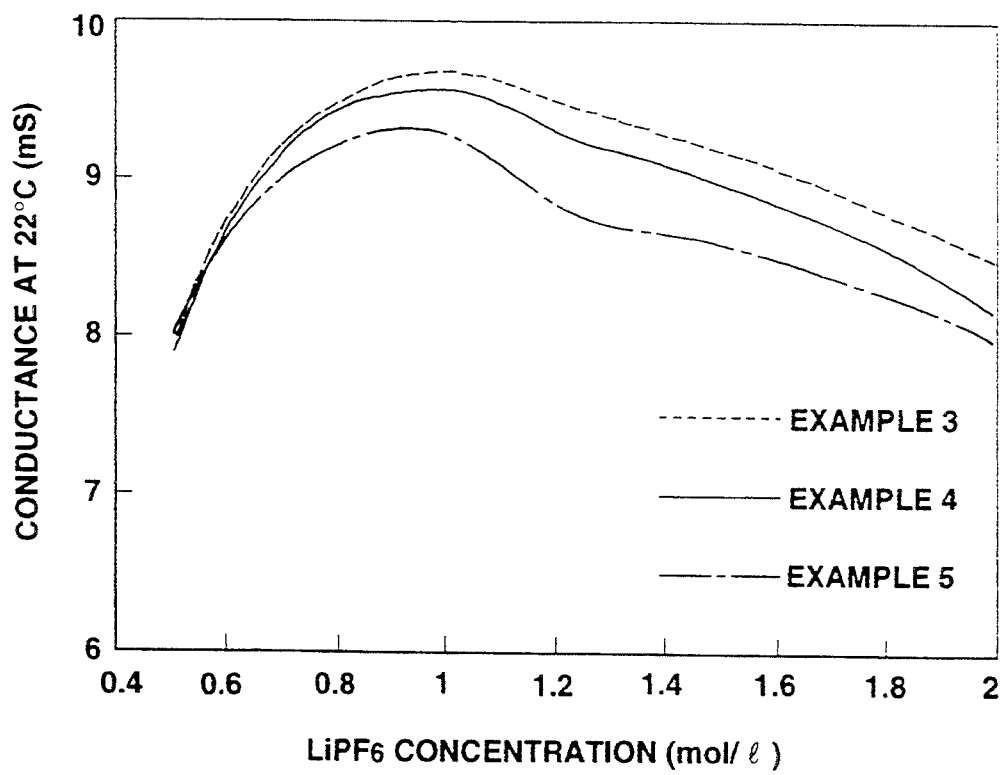
FIG. 10 is a graph showing the relation between the concentration of $LiPF_6$ in the electrolyte and the electrical conductance under an environment of the temperature of $22°$ C.
Figure 11:
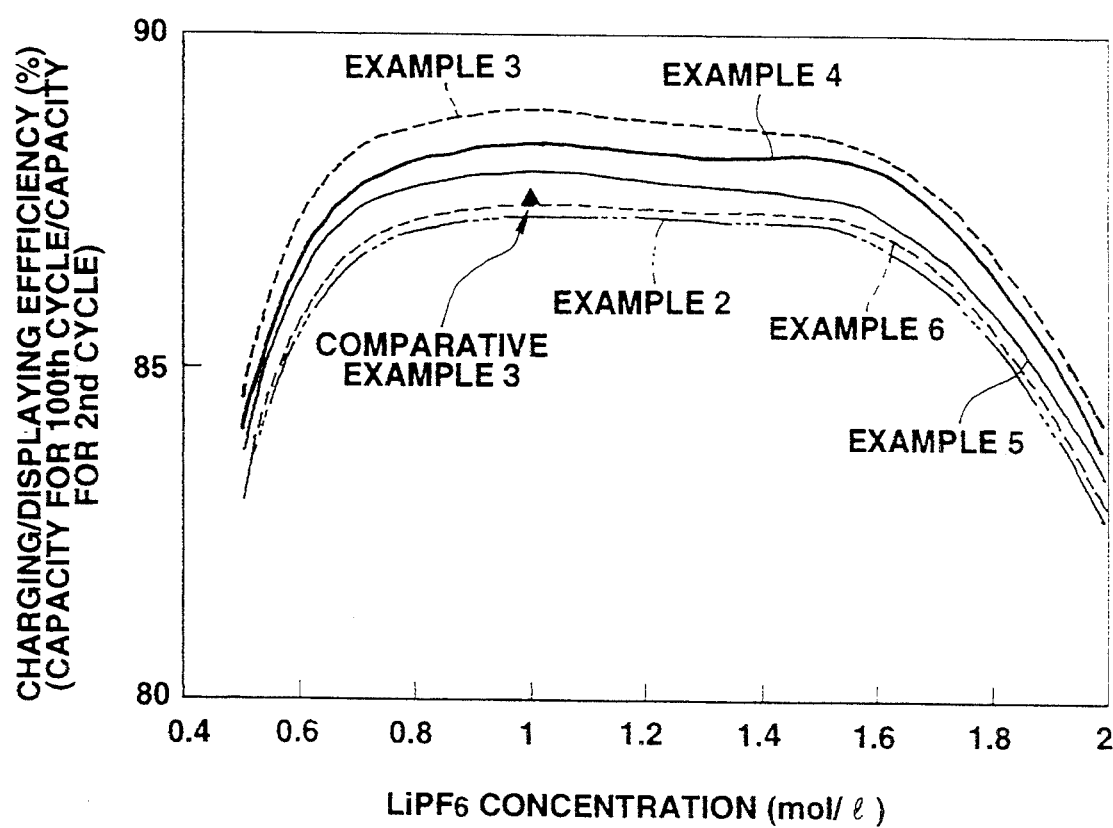
FIG. 11 is a graph showing the relation between the concentration of $LiPF_6$ in the electrolyte and the charging/discharging ratio.

FIGS. 5 and 6 show the relation between the electrolyte concentration in the electrolyte at −5° C. and the discharge capacity ratio for the third cycle, and the same relation for the 31st cycle, respectively. Besides, FIG. 7 shows the relation between the discharging capacity ratio for the 31st cycle at −5° C. and the volumetric ratio in percentage of MEC in the PC -MEC mixed solvent, with the $LiPF_6$ concentration being 1.0 mol/lit. FIG. 8 shows the relation between the electrolytic concentration in the electrolyte and the inner pressure in battery after allowing to stand at 90° C. FIG. 9 shows the MEC mixing ratio in the electrolyte and the electrical conductance, where the concentration indicated as mol/liter represents the $LiPF_6$ concentration. FIG. 10 shows the relation between the concentration of the electrolyte in the electrolyte and the electrical conductance. Meanwhile, in FIGS. 9 and 10, the electrical conductance was measured at 22° C. FIG. 11 shows the relation between the concentration of the electrolyte in the electrolyte and the capacity upkeep ratio.

It is seen from FIG. 5 that each of the batteries of embodiments 2 to 6, employing a mixed solution of MEC and PC as the non-aqueous solvents of the electrolytes, has a discharge capacity ratio under the environment of the temperature of −5° C. for the third cycle which is larger than that of the battery of comparative example 3 employing a mixed solvent of DEC and PC as the non-aqueous solvent. However, as may be seen from FIG. 6, each of the batteries of the embodiments 2 and 3 has the larger discharge capacity ratio for the 31st cycle and consequently exhibits superior practical low-temperature characteristics. Although the reason therefor cannot be known precisely, it may be contemplated that the internal pressure in the battery is increased to incur deterioration in the low-temperature characteristics with the progress in the battery deterioration caused by the charging/discharging cycles.

It may also be seen from FIG. 8 that each of the batteries of the embodiments 2 to 6 undergoes the rise in the internal pressure in the battery which is of the same order of magnitude as that in the battery of the Comparative Example 3 which may be said to exhibit generally satisfactory high-temperature characteristics, so that the batteries of the embodiments 2 to 6 exhibit acceptable high-temperature characteristics.

The above is in meeting with the tendency evidenced by FIGS. 2 and 4 and is in support of the fact that the use of the mixed solvent of MEG and PC as the non-aqueous solvent for the electrolyte is highly effective for producing a battery exhibiting superior characteristics over a wide temperature range.

It may also be seen from FIG. 9 that the electrical conductance of the electrolyte in which a mixed solvent of MEG and PC is employed as the non-aqueous solvent is changed depending on the MEC mixing ratio, in such a manner that, as the MEG mixing ratio is increased, the electrical conductance is increased and decreased on the low MEC mixing ratio side and on the high MEG mixing ratio side, respectively. That is, the electrolyte in which the MEC-PC mixed solvent is employed as the non-aqueous solvent has an optimum range for the MEG mixing ratio corresponding to the-increase in the electrical conductance of the electrolyte. However, for producing practicably acceptable low-temperature characteristics, it is desirable to set the MEC mixing ratio in a range of from 55 to 70 vol %, as shown in FIG. 7.

It is also seen from FIG. 10 that the electrical conductance of the electrolyte containing the HEC-PC mixed solvent as the non-aqueous solvent is changed with the electrolyte concentration, in such a manner that the electrical conductance is increased and decreased with increase in the electrolyte concentration on the low electrolyte concentration side and on the high electrolyte concentration side, respectively.

It is also seen from FIG. 11 that the capacity upkeep ratio of a battery employing the MEG and PC mixed solvent as the non-aqueous solvent for the electrolyte is also changed depending on the concentration of the electrolyte dissolved in the electrolyte, in such a manner that the capacity upkeep ratio is increased and decreased with increase in the concentration of the electrolyte on the low electrolyte concentration side and on the high electrolyte concentration side, respectively.

That is, the battery employing the MEG-PC mixed solvent as the non-aqueous solvent for the electrolyte has an optimum range for the electrolyte concentration, such that the electrolyte concentration of 0.6 to 1.8 mol / lit. of the solvent is desirable and practically satisfactory battery characteristics may be achieved with the electrolyte concentration in a range of from 0.8 to 1.3 mol/lit. of the solvent.

Although concrete examples of the present invention have been explained in the foregoing, it is to be noted that these Examples are given only for the sake of illustration and various changed may be made without departing from the scope of the invention.

Meanwhile, the effects substantially similar to those given above could be achieved with the use of ethylene carbonate, γ-butyrolactone, tetrahydrofuran, 2-methyl tetrahydrofuran, 1,3-dioxolan, 4-methyl 1,3-dioxolan, sulforane, methyl sulforane, acetonitrile, propionitrile or dimethyl sulfoxide, in place of propylene carbonate, as one of the components of the solvents employed in the above Examples.

It will be seen from the foregoing that, with the secondary battery containing a non-aqueous electrolyte according to the present invention, and comprising a positive electrode formed of a compound oxide of lithium, a negative electrode of a carbonaceous material and an electrolyte having an electrolyte dissolved in a non-aqueous solvent, the mixed solvent of MEC and PC is used as the non-aqueous solvent, so that the internal pressure within the battery is scarcely increased even if the battery is used under a high temperature environment, while the electrolyte is not solidified even if the battery is employed under a high temperature environment, so that a high energy density and a long service life as well as high operating reliability may be achieved over a broad range of the working temperature. Thus the battery may be employed even in the inside of a vehicle during summertime, with extremely desirable practical advantages.

What is claimed is:

1. A secondary battery containing a non-aqueous electrolyte therein, said secondary battery comprising a negative electrode formed of a carbonaceous material capable of doping and de-doping lithium, a positive electrode formed of $Li_xMO_2$, where M denotes at least, one of cobalt, nickel and manganese, and the non-aqueous electrolyte having an electrolyte dissolved in a non-aqueous solvent, characterized in that said non-aqueous solvent is a mixed solvent of propylene carbonate and methyl ethyl carbonate.

2. The secondary battery containing a non-aqueous electrolyte therein, as claimed in claim 1, characterized in that said non-aqueous solvent is a mixed solvent of propylene carbonate and methyl ethyl carbonate at a volumetric ratio of 6:4 to 3:7.

3. The secondary battery containing a non-aqueous electrolyte therein, as claimed in claim 2, characterized in that $LiPF_6$ is dissolved as an electrolyte in the non-aqueous solvent at a concentration of 0.6 to 1.8 mol/lit.

4. The secondary battery containing a non-aqueous electrolyte therein, as claimed in claim 2, characterized in that said non-aqueous solvent is a mixture of propylene carbonate and methyl ethyl carbonate at a volumetric ratio of 4.5:5.5 to 3:7 of propylene carbonate to methyl ethyl carbonate.

5. A secondary battery comprising:
a negative electrode including a carbonaceous material capable of doping and de-doping lithium;
a positive electrode including $Li_xMO_2$, wherein M represents at least one metal selected from the group consisting of cobalt, nickel and manganese; and
a non-aqueous electrolyte solution including a mixed solvent of propylene carbonate and methyl ethyl carbonate present in a volume ratio of from about 6:4 to about 3:7, respectively, and a lithium containing electrolyte selected from the group consisting of: $LiPF_6$, $LiClO_4$, $LiAsF_6$, $LiBF_4$, $LiB(C_6H_5)_4$, $CH_3SO_3Li$, $LiCl$ and $LiBr$.

6. A secondary battery as defined in claim 5, wherein said electrolyte is $LiPF_6$.

7. A secondary battery as defined in claim 6, wherein the $LiPF_6$ electrolyte is present in the non-aqueous electrolyte solution in an amount of from about 0.6 to about 1.8 moles/liter.

8. A secondary battery comprising: a negative electrode including a carbonaceous material capable of doping and de-doping lithium; a positive electrode including $LiMO_2$, wherein M represents at least one metal selected from the group consisting of cobalt, nickel and manganese; and a non-aqueous electrolyte solution including from about 0.6 to about 1.8 moles/liter of $LiPF_6$ and a mixed solvent including propylene carbonate and methyl ethyl carbonate present in a volume ratio of from between about 6:40 to about 3:7, respectively.

* * * * *